June 29, 1954  S. SENSIPER  2,682,641
SELECTIVE MODE ATTENUATOR FOR WAVE GUIDES
Filed May 28, 1949
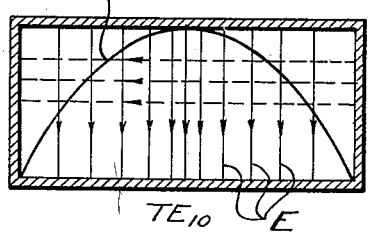
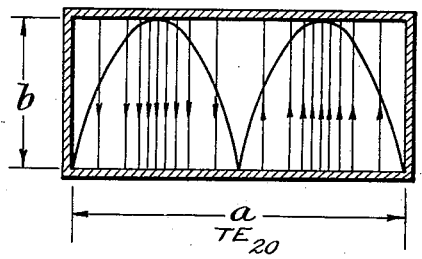
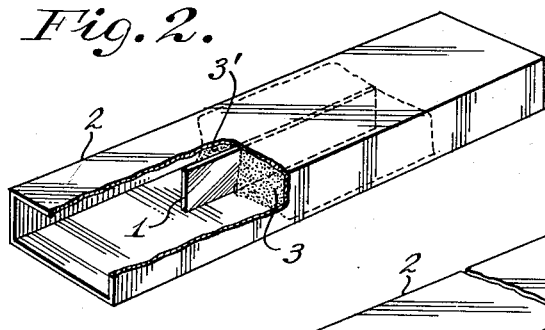
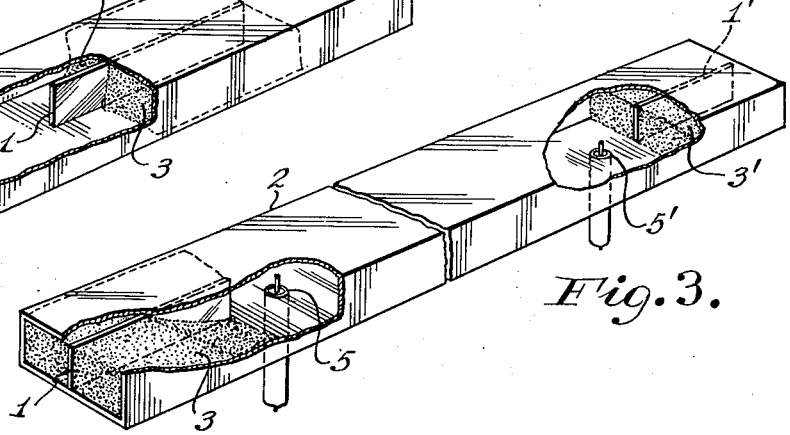
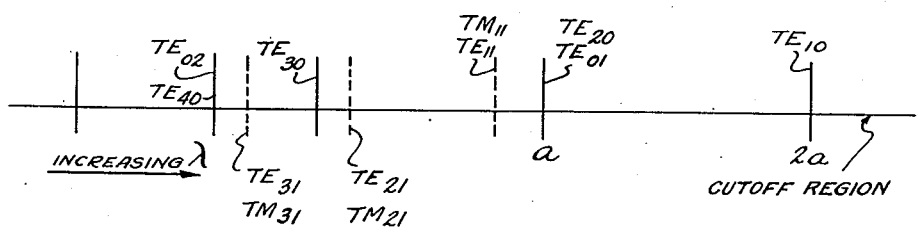
INVENTOR
SAMUEL SENSIPER
BY
Paul B. Hunter,
ATTORNEY Patented June 29, 1954

2,682,641

UNITED STATES PATENT OFFICE 2,682,641

SELECTIVE MODE ATTENUATOR FOR WAVE GUIDES

Samuel Sensiper, Cambridge, Mass., assignor to The Sperry Corporation, a corporation of Delaware Application May 28, 1949, Serial No. 95,915

4 Claims. (Cl. 333—81)

This invention relates to ultra-high-frequency wave guides and more particularly to broad band wave guides having means to reflect certain modes of propagation.

The basic theory of electromagnetic propagation in wave guides is now well known, for instance see W. L. Barrow, Transmission of Electromagnetic Waves in Hollow Tubes of Metal, Proc. Inst. Radio Engineers 24, 1298–1328 (1936); G. C. Southworth, Hyper Frequency Wave Guides, General Considerations and Experimental Results, Bell System Tech. J., 15, 284–309 (1936). However, a brief discussion of the underlying principles will be presented in the specification for providing an understanding of the invention. Much of this background discussion has been derived from the book "Microwave Transmission Design Data" by Theodore Moreno, published by McGraw Hill, 1948.

The present invention is primarily concerned with broadening the usable frequency band of wave guides and associated components. This desired result is accomplished generally by discriminating in favor of certain modes of transmission. This is done by reflecting them with the devices of the present invention. Means to discriminate by absorbing certain modes are disclosed in my copending application Serial No. 100,851 filed June 23, 1949, for Absorptive Filters for Wave Guides.

Accordingly, a primary object of the invention is to provide novel methods and apparatus for increasing the usable frequency bandwidth of wave guides.

Another object of the invention is to provide mode filter means for electromagnetic energy transmission in a wave guide.

Another object of the invention is to provide new and improved reflection mode filters for wave guides.

Another object of the invention is to provide means in a wave guide for reflecting certain modes of electromagnetic energy transmission and absorbing other modes.

Another object of the invention is to provide means for making wave guides more efficient.

These and other objects will become apparent from the following specification and illustrations of which:

Figs. 1A and 1B are a pair of illustrative wave guide diagrams;

Fig. 2 is an illustration of an embodiment of the invention;

Fig. 3 is an illustration of another embodiment; and

Fig. 4 is a graph illustration of the invention.

In the ordinary rectangular wave guide, there is an infinite number of possible modes by which energy may be carried. Each of these modes is characterized by a distinctive field configuration, and each represents a solution of Maxwell's equations that will fit the boundary conditions imposed by the particular wave guide.

In any wave guide, the possible modes of transmission may be divided into two classes, both infinite in number. In one class, the magnetic field has, in addition to transverse components, a component parallel to the guide axis, which is the axis of wave propagation, but the electric field is everywhere transverse to the axis. For this reason, waves of this class are referred to as transverse electric, or TE waves. Waves of this type are also called H waves, as it is only the magnetic field that has an axial component.

Waves of the second class are characterized by having a component of electric field parallel to the guide axis in addition to transverse components, but a magnetic field that is everywhere only transverse to the axis. These waves are therefore known as transverse magnetic, or TM waves. They are also called E waves.

The individual modes in rectangular wave guides are identified by giving the class of the transmission mode, followed by two numerical subscripts. These two subscripts are integers that indicate the number of half-period variations in transverse field intensity along the $a$ and $b$ dimensions of the guide, respectively. For example, the dominant mode in ordinary rectangular wave guides is the $TE_{10}$ mode, Fig. 1A, which indicates that the wave is of the transverse electric type, and that there is a single half-sinusoidal variation 9 of transverse electric field $E$ along the $a$ dimension, and that there is no variation of transverse electric field along the $b$ dimension. The horizontal dotted lines show the magnetic field. Fig. 1B shows the $TE_{20}$ electric field configuration, having a null in the center of the guide, with the E field components out of phase on either side of the null.

All modes of transmission in wave guides, and all modes except the principal mode in any transmission line, will carry energy down the line only if the frequency is over a certain limiting or cutoff value. This value depends upon the size and configuration of the line as well as upon the particular mode of transmission. If these modes are excited in a line at frequencies below their cutoff frequencies, they will carry no real energy down the line, and the electric and magnetic fields associated with any given mode will diminish rapidly with distance from the point of excitation.

For any wave guide the mode of transmission that has the lowest cutoff frequency is called the dominant mode. A practical wave guide is generally designed so that it is able to carry energy in only one mode of transmission. For this reason, the line is so restricted in size that only the dominant mode can transmit energy, and the line is then below cutoff for all the infinity of higher modes.

Any physical structure that launches a traveling wave in a line will generally excite a large number of modes at the point of excitation. Only the modes that are above cutoff, usually only one mode, are able to carry energy down the line, and the other modes that are below cutoff are unable to carry any real energy down the line. They attenuate rapidly with distance from the point of excitation and are usually negligible at a distance roughly equal to the transverse dimensions of the line.

The higher order modes will in general also be set up by a discontinuity in the line. For instance, if there is an abrupt change in cross section, and it is not possible to meet the boundary conditions at the discontinuity by addition of components of the principal and above-cutoff modes only, below-cutoff modes will be excited at the point of discontinuity.

A wave guide is a rather narrow band transmission system, since if a rectangular wave guide is used in the customary manner to carry only the dominant mode of transmission, the free-space wavelength must not exceed twice the width of the guide, or the guide will be below cutoff for the dominant mode. On the other hand, if the free-space wavelength is equal to or less than the guide width, the guide will be above cutoff for the $TE_{20}$ mode of transmission. Therefore a 2:1 frequency range is the theoretical maximum if higher modes are to be avoided. This frequency range may be extended by artificially discriminating against these higher modes, according to the teaching of the present invention, as will be discussed hereafter.

For most applications, it is desirable that the frequency range be still further restricted. The attenuation rises very sharply as cutoff is approached, and for this reason it is usually desirable to restrict the maximum operating wavelength to about 1.60 times the inside width of the wave guide. At the short wavelength end, one should not approach too near cutoff for the $TE_{20}$ mode, as it will then attenuate very slowly when excited by a discontinuity. The minimum operating wavelength that is recommended is about 1.05 times the inside width of the guide. If these limits are adhered to, the wave guide may be used over a frequency range only slightly greater than 1.5:1.

To avoid the $TE_{01}$ mode of transmission, the inside height of the guide should be less than a half wavelength at the shortest operating wavelength and should therefore not exceed half the inside width of the guide. By decreasing the height still further below this value will increase the attenuation in the guide, which in this region will be approximately inversely proportional to the height of the guide. So, for minimum attenuation, the inside height of the guide should be nearly half the width.

One of the most important reasons for the limitation on the bandwidth of the normal rectangular guide is the possibility of the $TE_{20}$ excitation. As the frequency is increased, the $TE_{20}$ is the first higher mode excited. Also discontinuities in the guide such as elbows, and changes in dimensions will in general cause higher order TE and TM modes and energy will propagate in the $TE_{20}$ mode as well as in the $TE_{10}$ mode. The $TE_{20}$ power will be reflected and cause undesirable resonances to effectively appear in the desired $TE_{10}$ mode operation. In the rectangular guides commonly used to date, the guide dimension $a/b$ ratio is somewhat larger than 2, so that the $TE_{01}$ propagates before the $TE_{01}$ mode propagates.

If the $TE_{10}$ and the $TE_{20}$ propagation is present, then at the point where the $TE_{20}$ mode is generated a hypothetical equivalent transformer arrangement exists in which a separate $TE_{10}$ mode line is coupled to a $TE_{20}$ mode line. It may be assumed that in the equivalent circuit the lines will carry only their own mode. If then the $TE_{20}$ line is properly terminated, no reaction back on the $TE_{10}$ lines will occur. Of course, this will mean a slight loss of energy, but it is well worthwhile to pay this price in order to eliminate resonances and undesirable asymmetries in the guide and in the radiation pattern, if the wave guide is used for radiation or for a primary source for a reflector or lens.

One of the problems is to terminate the $TE_{20}$ line without terminatnig the $TE_{10}$ line, or at least so as to allow a free choice in how the $TE_{10}$ line is terminated. It is desirable to do this over a broad band, and it is also desirable to terminate any higher order transmission modes which are coupled, even though this may reduce the total available power in the $TE_{10}$ mode. The present invention does this.

Once higher order modes which can be transmitted are generated, it is desirable to absorb them rather than to attempt to convert them back into $TE_{10}$ mode energy. Although means for the reconversion are possible to devise, all likely ones would appear to be quite narrow band devices and would possibly do more damage than good to the propagation of the $TE_{10}$ mode. One approach is to separate the mode energies and to feed power back into the $TE_{10}$ line in the proper phase, but the improbability of doing this properly over even a narrow band is so high as to make the absorption of the higher modes preferable.

Fig. 2 illustrates an embodiment of the invention, and shows a conductive fin 1 which may be metal which is placed in the center of the guide 2 parallel to the $b$ dimension so as to reflect $TE_{10}$ energy but not $TE_{20}$ energy. It may be considered that this reflection occurs because the $TE_{10}$ mode has a maximum, and the $TE_{20}$ mode has a null in the center of the $a$ dimension, as previously shown in Fig. 1. By allowing the resulting divided guides of dimensions $a/2 \times b$ to be sufficiently long, and by placing resistance material 3 and 3', such as polyiron or other absorbing material in these regions, this device acts like a $TE_{20}$ termination of considerable excellence, but reflects or acts as a short to $TE_{10}$ energy. Since the attenuation in the restricted guide is high for the $TE_{10}$ mode, one may put the absorbing material close to the fin 1. The $TE_{01}$ mode is polarized horizontally so that it is not reflected by fin 1.

A typical application of the invention is illustrated in Fig. 3. Fins 1 and 1' are $TE_{10}$ shorts or reflectors, input and output coaxial to wave guide transformers 5 and 5' transmit and receive energy, and resistance material 3, 3' is the absorber of $TE_{20}$ and higher mode energy. The interconnecting wave guide is sufficiently large to allow $TE_{20}$ mode propagation, and may contain some discontinuities not shown which result in generation of $TE_{20}$. The coaxial to wave guide transformers 5 and 5' do not affect or absorb the $TE_{20}$ mode or affect it only slightly and the resistance material 3 will absorb all of the $TE_{20}$ mode present. Therefore, a wider frequency band than normal can be transmitted between the coaxial terminals 5 and 5' because the limitations due to $TE_{20}$ mode are minimized.

The absorbing device 3 may comprise pieces of resistance card, tapered and placed in a conventional manner on both sides of the guides. Other equivalent microwave attenuators may be used. Generally any material having a high resistance to D. C. will be a good microwave attenuator. It may be noted that this device will tend to absorb without reflection, all $TE_{no}$ modes, where $n$ is an even number. However $TE_{mo}$ modes where $m$ is odd will tend to be reflected. If the main guide will support in a propagating state a $TE_{no}$ mode, the divided guide $a/2$ in width will support a $$TE_{\frac{n}{2}o}$$

mode in a propagating state, and a fair portion of the $TE_{no}$ mode of the main guide $$(TE_{\frac{n}{2}o}$$

of the divided guide) will also be transmitted down the divided portion of the guide to be absorbed.

The exact conditions in a particular case will now be examined. In a rectangular wave guide, for any particular mode of transmission, the cutoff wavelength $\lambda_c$ is given in terms of the guide dimensions $a$ and $b$ by $$\lambda_c = \frac{2}{\sqrt{\left(\frac{m}{a}\right)^2 + \left(\frac{n}{b}\right)^2}}$$

In this formula, $m$ and $n$ are the subscripts denoting the particular mode under consideration (e. g., $TE_{m,n}$ or $TM_{m,n}$) and $\lambda_c$ is the limiting or cutoff wavelength. The equation holds for either TE or TM modes of transmission. $\lambda_c$ is the wavelength of the relevant frequency in an unrestricted or isotropic homogeneous medium with the same permittivity and permeability as that filling the wave guide.

The size of guide necessary for transmission of some of the lower modes may be determined from the above equation. For example, the $TE_{20}$ mode can carry energy in all sizes of wave guide in which $a/\lambda$ is greater than unity. To allow only the dominate mode to carry energy, one dimension of the guide should not exceed $\lambda$ and should not be less than $\lambda/2$ and the other should not exceed $\lambda/2$. The $TE_{10}$ mode alone will carry energy when $a/\lambda$ is between .5 and 1.0.

Assume $a=2b$ and consider Fig. 4, in which the cutoff $\lambda$ of all possible modes are plotted. At a $\lambda$ of more than $2a$, at the right hand edge of Fig. 4, all modes are cutoff. As $\lambda$ is decreased, i. e. frequency increased, to where $\lambda=2a$ then the dominant $TE_{10}$ mode carries energy. When $\lambda$ becomes equal to $a$ then the $TE_{20}$ mode carries energy, etc.

It may be seen from Fig. 4 that as the frequency is increased, the $TE_{20}$ and $TE_{01}$ modes may be troublesome as they are the first of the higher modes to be excited. The cutoff wavelength of the $TE_{01}$ mode can be reduced somewhat by decreasing $b$. The present invention, by absorbing the $TE_{20}$ mode and reflecting the $TE_{10}$ mode, extends the useful frequency range of a given size wave guide. The $TE_{01}$ mode is not substantially reflected as this mode has horizontally polarized E vectors.

All the fins or struts mentioned in the present discussion may have a gradual tapering cross section at their leading and trailing edges to minimize the effects of possible discontinuities in the guide. In a preferable embodiment the fins may be of discrete length for instance ¼ of the guide wavelength of the mode to be reflected.

The teaching of the present invention has many advantages. By utilizing the mode sensitive filters of the present invention, it is possible to utilize a given size wave guide for a greater band of frequencies. In other words, the filters of the present invention tend to broaden the frequency band of conventional wave guides. This is particularly useful for test equipment where flexibility and versatility are important factors.

Another application in which the present device may be utilized is the using of a single wave guide for several simultaneous communications, employing frequency or mode division to multiplex them. The higher frequencies may be excited in the guide so as to propagate at the higher modes and the mode filters of the present invention may then be used to separate the different frequencies. The invention is not limited to air-filled guides but may be used with any type, for instance those filled with a solid dielectric.

To conclude, it has been shown that the present invention offers means and methods for utilizing rectangular guides over a wider than normal band without higher mode difficulties by virtue of discriminating against the higher modes, with reflective filters.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Broad band wave guide means comprising a rectangular wave guide capable of supporting the $TE_{10}$ and the $TE_{20}$ modes of transmission, means to reflect $TE_{10}$ mode consisting of a conductive fin placed perpendicular to and at the middle of the greater cross-sectional guide dimension, and means to absorb the $TE_{20}$ mode consisting of energy absorbing material placed between said fin and at least one of the narrower wave guide sides.

2. A wave guide mode filter comprising a single conductive element positioned within the wave guide for reflecting the dominant mode of propagation and placed at the point of maximum field intensity of said mode, and energy absorbing means positioned adjacent said element in said wave guide to prevent reflections of higher order modes of propagation, said element and energy absorbing means together extending across the entire cross sectional area within the wave guide.

3. Broad band wave guide means comprising a rectangular wave guide, means to excite said wave guide in the $TE_{10}$ mode, a conductive fin placed perpendicular to and in the middle of the large dimension of said wave guide to reflect said $TE_{10}$ mode, and energy absorbing means placed on either side of said fin.

4. In a rectangular wave guide, a mode filter for electromagnetic energy comprising a conductive fin perpendicular to the larger dimension of said wave guide and spaced equally between the narrower wave guide sides, and resistance material placed between said fin and the narrower sides of the wave guide, to absorb even order TE modes.

References Cited in the file of this patent

UNITED STATES PATENTS

| Number | Name | Date |
|---|---|---|
| 2,088,749 | King | Aug. 3, 1937 |
| 2,129,669 | Bowen | Sept. 13, 1938 |
| 2,425,345 | Ring | Aug. 12, 1947 |
| 2,439,388 | Hansen | Apr. 13, 1948 |
| 2,441,598 | Robertson | May 18, 1948 |
| 2,471,419 | Edson et al. | May 31, 1949 |
| 2,491,662 | Houghton | Dec. 20, 1949 |

FOREIGN PATENTS

| Number | Country | Date |
|---|---|---|
| 605,300 | Great Britain | July 20, 1948 |